March 18, 1952 — H. G. JOHNSTONE — 2,589,700
ELECTRIC CABLE SHEATHING
Filed July 16, 1949
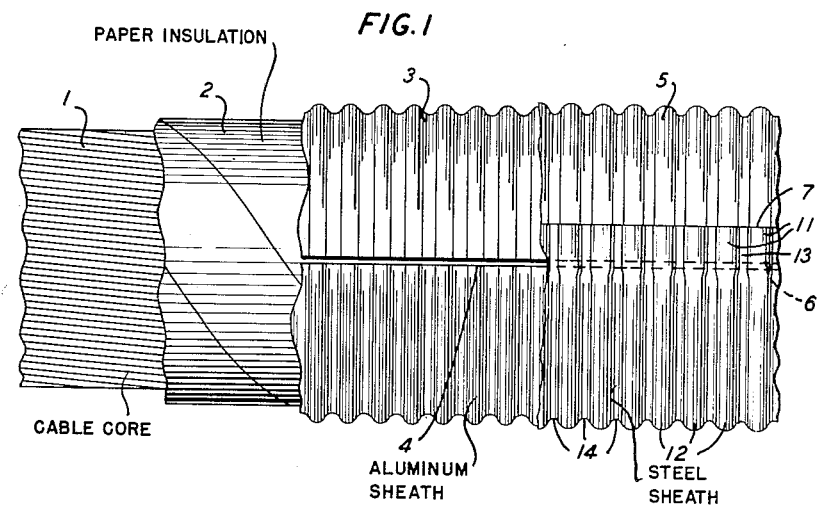
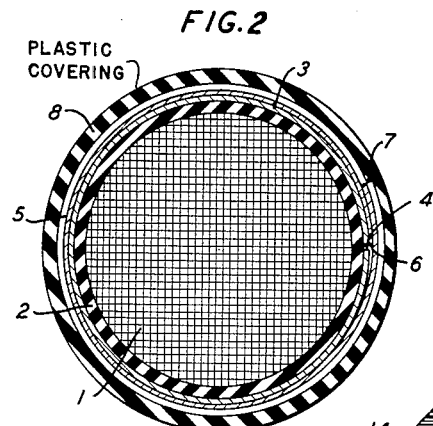
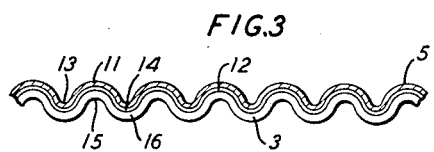
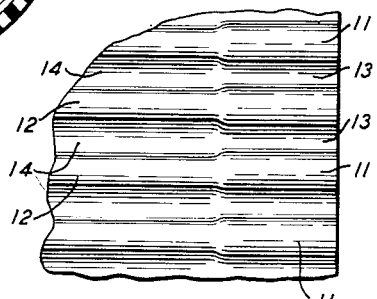
INVENTOR
H.G. JOHNSTONE
BY
ATTORNEY Patented Mar. 18, 1952

2,589,700

UNITED STATES PATENT OFFICE 2,589,700

ELECTRIC CABLE SHEATHING

Harold G. Johnstone, Plainfield, N. J., assignor to Western Electric Company, Incorporated, New York, N. Y., a corporation of New York Application July 16, 1949, Serial No. 105,208

3 Claims. (Cl. 174—106)

This invention relates to electric cables, and particularly to the sheathing for protecting the conductors of such cables.

For many years it has been common practice to cover cables, which must be impervious to moisture, with a lead sheath. While lead is a perfect water barrier, lead sheath cables, particularly in the larger sizes, are very stiff and difficult to handle and the sheathing comprises a large proportion of the total cable weight. More recently, in view of these disadvantages and the scarcity and high cost of lead, various other types of sheathing have been proposed.

In one type of communication cable, which already is being used extensively, the cable core is covered with a thin overlapping layer of highly conductive metal, such as aluminum, which is usually corrugated circumferentially of the cable to make it pliable. This metal sheath serves to shield the cable from lightning and inductive effects such as cross-talk from other cables and also forms, except at the overlap, a metallic barrier to the penetration of moisture. The metal layer is mechanically and chemically protected by an overlying layer of plastic applied with a thick wall to provide as good a water barrier as possible.

While plastics, such as polyethylene, form a substantially complete water barrier, tests of cables of this type indicate the possibility that over long periods, such as 15 to 25 years, sufficient moisture may penetrate the plastic to shorten the useful life of the cable. It is therefore deemed advisable to provide a positive water barrier between the plastic and the cable core. In the manufacture of such cables, it is, of course, desirable from a cost standpoint to apply the metal and plastic sheaths on a continuous or straight line basis at the highest possible speed. It has been found impossible, however, to solder a longitudinal seam in highly conductive metals, such as copper, at cable speeds comparable with the capacity of the extruders used to apply the plastic sheath. It therefore is the practice to form the metal sheath about the core with an overlap which is sealed by a viscous cement.

The object of this invention is to make such cables completely impervious to moisture by means of a sheathing structure which is lighter and more flexible and less expensive than lead, and which can be applied on a continuous basis at economical manufacturing speeds.

According to the invention, the sheathing comprises essentially an inner highly conductive metallic sheath, an intermediate metallic sheath of high resistivity with an overlapped, longitudinally extending, soldered seam and an outer sheath of plastic material. The inner sheath of aluminum, copper or other suitable metal provides the required longitudinal conductivity and may be formed around the core from flat tape of sufficient width that its edges are substantially abutting. The intermediate sheath may be of steel, with overlapping surfaces tinned for rapid soldering by induction heating. The outer plastic sheath in this construction is not required to function as a water barrier and is applied mainly to provide mechanical and chemical protection and thus may be substantially thinner than in present cables with a corresponding reduction in cost and increase in flexibility.

When metal sheathing is not positively held in place as by soldering, the cable core is somewhat loosely enclosed with the result that the overall diameter of the cable sometimes may be considerably larger than a corresponding lead sheathed cable. In the structure of the present invention the soldered seam may be cooled in a die to give a uniform diameter over the metal sheath as small as is consistent with good electrical characteristics of the core. The addition of the soldered sheath therefore does not increase the cable diameter but actually makes it possible to reduce it to the size of the same cable sheathed with lead.

Other objects and features of the invention will be apparent from the following detailed description taken in conjunction with the attached drawing in which:

Fig. 1 is a cutaway side view of an electrical cable having a sheathing according to the invention;

Fig. 2 is a sectional view of the same cable showing an additional outer covering of a plastic material;

Fig. 3 is a sectional view of corrugated strips of aluminum and steel, showing how these corrugations are formed to fit together;

Fig. 4 is a cutaway view of the steel strip showing how the overlapping portion of the strip is corrugated differently from the main portion to provide a tight fitting joint.

With reference to the drawings, a cable core comprising a plurality of insulated electrical conductors is designated as 1. Prior to sheathing, a paper tape 2 is wound spirally about the cable core and serves to insulate the core as a whole from its sheathing in addition to acting as a mechanical binding. A corrugated strip of aluminum 3 is next folded longitudinally about the cable core 1 and the paper wrapping 2. The aluminum strip has a width of about the circumference of the cable core with its paper wrapping so that when folded about the core as shown in Fig. 1, the two sides of the strip will just miss abutting. It is not necessary that the edges of the aluminum strip be joined as the aluminum is used for lightning protection and inductive shielding, and in these functions it is the longitudinal conductivity which is important and not the circumferential conductivity.

Next above the aluminum sheath is placed a strip of steel 5 having corrugations which match those of the aluminum strip as explained in connection with Figs. 2 and 4. Before being formed about the cable core, the steel strip is given a coat of tin or terne in any suitable manner, the coating being applied to aid in subsequent soldering operations, and also to minimize corrosive agents on the steel. The steel strip has a width about one-half inch greater than the aluminum strip.

In placing the steel strip about the cable core it is usually positioned so that one edge coincides with one edge of the inner aluminum strip. Positioning of the two strips in this manner is not necessary to the invention, but is usually more practical and less expensive from a manufacturing standpoint. This positioning may be done either by welding or otherwise adhering the two strips together before they are formed about the cable core, or by guiding them as separate strips during the forming process to insure having one edge of each strip coincide. By positioning the two strips in this manner, it will be seen that one edge 6 of the steel strip 5 will line up with the aluminum edge 4 while the other edge 7 will overlap the edge 6 as seen in Fig. 1, due to the extra width of the steel strip. This overlap, which will be approximately one quarter inch, may then be joined together by soldering to provide the cable core with a hermetically sealed water barrier.

An external layer 8 of a plastic material, as for example polyethylene, is next extruded or formed over the sheath comprising the aluminum and steel strips to add mechanical strength and corrosion protection to the cable, and to guard against abrasion during handling and placement of the cable. In addition, plastics such as polyethylene are second only to metals as an effective barrier to the entrance of water into the cable, and the use of an external layer of such a material as a primary barrier is added insurance against moisture leakage.

It is also highly desirable to apply a thermoplastic or similar type of cement to the outer steel sheathing after it has been soldered and before the external plastic layer 8 has been extruded over the cable. This cement serves to join the plastic layer 8 to the steel sheath, seals minor defects, if any, in the soldered joint, and, by filling in the valleys of the corrugations, forms a series of rings which prevent longitudinal migration of any moisture which might find its way through the external plastic layer.

Referring now to Fig. 3, it will be seen that the corrugations of the steel and aluminum strips are given contours which will enable them to maintain a close and snug fit with respect to each other. It is obvious that if both strips had the same corrugation angles throughout, the two strips could not fit snugly together, because of the thickness of the strip material, and small gaps would be left where the hills and valleys would normally touch. This difficulty is overcome by giving different radii of curvatures to the hills and to the valleys of the sets of corrugations, at 15 and 16, which enable them to come together in a close fit, as shown on the drawing.

Where one edge of the steel strip overlaps the other, it is necessary to corrugate one of the edges differently from the other to enable a close fit to be obtained. This is accomplished as shown in Fig. 4 by giving the hills 11 of the overlapping edge a larger radius of curvature than the corresponding hills 12 of the main part of the strip, and by giving the valleys 13 of the overlapping edge a smaller radius of curvature than the corresponding valleys 14. When this has been done the corrugations will fit together snugly when the two edges are overlapped.

In the sheathing as herein proposed aluminum was chosen as the inner layer since it is both light and a good conductor and is an effective material for use as lightning protection and to shield the cable from the inductive effect of nearby conductors or cables. Steel is used for the outer metal layer because of its effectiveness as a water barrier, its workability and low cost, and because of the relative ease with which it may be tinned for soldering operations. In addition, where the overlapping joint is sealed by induction soldering, the hysteresis and eddy current losses of the steel plus its relatively poor conductivity of heat greatly aid in the soldering action accomplished through this method of heating, as the heat generated locally is not quickly conducted away. Since it is not used for conductive purposes, as is the aluminum, the steel strip may usually be thinner than the aluminum strip.

The only requirement as to the extent of overlap of the steel strip is that there be sufficient overlap to permit the forming of a firm hermetically sealed joint. Although the steel strip in the present instance has been described as being one half inch wider than the aluminum strip so as to allow at least a quarter inch overlap when the steel strip is folded about the cable core, the amount of overlap is not to be regarded as fixed, but may be varied according to the size of the cable being sheathed.

Applicant realizes that aluminum has previously been used in connection with an external plastic layer as a sheathing for cable, and also that soldered steel and plastic have been used together for the same purpose. Applicant's combination aluminum and steel sheathing in conjunction with an external layer of plastic combines the best features and advantages of these prior sheathings. Conductivity is provided by the aluminum, hermetical sealing and solderability by the steel and mechanical strength and chemical protection by the external plastic layer. Furthermore, the combined cable and sheathing is relatively inexpensive to manufacture and is light and easy to handle. Cables using a sheathing as herein described have unit weights which are approximately half of the weights which obtain when lead sheathing is used.

The proposed sheathing is well adapted to straight line cable manufacture on a large scale as the tinned steel may be soldered at linear rates comparable to the speed of other steps in the manufacturing process. The sheathing also lends itself to splicing operations as lead splicing sleeves for example may easily be soldered to the steel covering for this purpose. The resistivity of the steel, with its resultant retention of heat generated locally, allows the use of seam solder having a higher melting point than the solder used in splicing, which prevents melting of the seam during the splicing operation.

Although the invention has been described with particular reference to corrugated cable sheathing, it is not limited to this type, but is equally applicable in connection with flat uncorrugated sheathing where smaller diameters of cable permit this type of cable covering to be used.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an electrical cable, a cable core, an insulating material about the core, a corrugated strip of highly conductive metal formed longitudinally about the core and over the insulating material for lighting protection and inductive shielding, a steel strip folded longitudinally with a soldered overlap about the said highly conductive metal strip and having corrugations interfitting snugly with those of the said metal strip, the said steel strip being wider than the highly conductive strip and having high electrical resistivity to provide an induction heated soldered joint at the overlapped portions as a hermetically sealed water barrier, and an outer plastic sheath for protecting the soldered overlapped steel strip.

2. In an electrical cable, a cable core, an insulating paper wrapped about the core, a corrugated aluminum strip formed longitudinally about the core and over the insulating paper for lightning protection and inductive shielding, a steel strip folded longitudinally with a soldered overlap about the said corrugated aluminum strip and having corrugations interfitting snugly with those of the aluminum strip, the said steel strip being wider than the aluminum strip and having high electrical resistivity to provide an induction heated soldered joint at the overlapped portions as a hermetically water sealed barrier, a layer of thermo plastic cement over the corrugated steel strip, and an outer plastic sheath over the cement covered steel strip.

3. In an electrical cable, a cable core, an insulating material about the core, a corrugated aluminum strip running longitudinally of the core and on top of the insulating material, a covering of corrugated steel tape running longitudinally of the core and over the aluminum strip and which is both wider and thinner than the aluminum strip and having one edge overlapping and soldered to the other edge, the corrugations of the two metal strips interfitting snugly with each other, the said steel strip being tinned and of high electrical resistivity to provide induction heat soldering of the overlapped portions, and an outer plastic sheath for protecting the soldered overlapped steel strip.

HAROLD G. JOHNSTONE.

REFERENCES CITED

The following references are of record in the file of this patent:

UNITED STATES PATENTS

| Number | Name | Date |
| --- | --- | --- |
| 1,187,509 | Dean | June 20, 1916 |
| 2,039,781 | Debenedetti | May 5, 1936 |
| 2,041,842 | Layton | May 26, 1936 |
| 2,255,472 | Quarnstrom | Sept. 9, 1941 |
| 2,386,747 | Ris | Oct. 16, 1945 |

FOREIGN PATENTS

| Number | Country | Date |
| --- | --- | --- |
| 516,908 | Great Britain | Jan. 15, 1940 |
| 526,593 | Great Britain | Sept. 20, 1940 |
| 659,505 | Germany | May 4, 1938 |

OTHER REFERENCES

Publication in Bell Laboratories Record; Nov. 1948; pages 442–444. (Copy in Div. 65.)